United States Patent [19]

Cumpston

[11] 4,137,092
[45] Jan. 30, 1979

[54] DISPERSION OR SUSPENSION OF SOLID PHASE IN LIQUID PHASE

[76] Inventor: Edward H. Cumpston, 43 Monument Ave., Old Bennington, Vt. 05201

[21] Appl. No.: 655,990

[22] Filed: Feb. 6, 1976

[51] Int. Cl.² ........................... C09C 3/04; C09C 1/42
[52] U.S. Cl. ................................. 106/288 B; 106/72; 106/306; 106/298; 106/300; 106/307; 106/309
[58] Field of Search .................. 241/260; 259/10, 146, 259/153, 165; 106/309, 288 B, 72

[56] References Cited

U.S. PATENT DOCUMENTS

| | | | |
|---|---|---|---|
| 2,535,647 | 12/1950 | Millman et al. | 106/72 |
| 2,907,666 | 10/1959 | Millman et al. | 106/72 |
| 3,106,476 | 10/1963 | Millman et al. | 106/309 |
| 3,806,050 | 4/1974 | Cumpston, Jr. | 241/260 |
| 3,834,924 | 9/1974 | Grillo | 106/309 |
| 3,995,838 | 12/1976 | Zucker | 259/10 |

*Primary Examiner*—Winston A. Douglas
*Assistant Examiner*—J. V. Howard
*Attorney, Agent, or Firm*—Stonebraker, Shepard & Stephens

[57] ABSTRACT

The inventive method uses a continuous mixer for making dispersions or suspensions of a solid phase in a liquid phase. The solid and liquid phases are fed continuously into the mixer at respective input rates resulting in a combined proportion of solid phase to liquid phase. The combined phases are continuously formed into a third phase as a plastic-consistency layer extending all around the mixing region. The third phase is thick enough in its plastic consistency for continuously receiving the solid and liquid phases and preventing their passage through the mixing region until they are homogeneously mixed together. The third phase is thoroughly mixed until it changes from its plastic consistency to a substantially more flowable fourth phase capable of continuous output flow from the mixer.

4 Claims, 3 Drawing Figures

DISPERSION OR SUSPENSION OF SOLID PHASE IN LIQUID PHASE

BACKGROUND OF THE INVENTION

Dispersions or suspensions of solid phases in liquid phases were previously made on a batch basis, except for relatively dilute dispersions or suspensions. The solid phase was added gradually to a batch of the liquid phase in a mixer having an impeller turning at a high rpm to produce high fluid shear. As more of the solid phase was added, the viscosity of the batch increased so that further addition of the solid phase had to be reduced to a slow rate to prevent overloading the impeller.

THE INVENTIVE IMPROVEMENT

The invention involves recognition of a way that dispersions or suspensions can be made continuously without relying on a high value of continuous fluid shear. The invention aims at more complete dispersions or suspensions and a potential capacity for dispersing or suspending a larger proportion of solid phase in a liquid phase. The invention also seeks speed, economy, and improved results in dispersing or suspending a wide variety of solid phases in liquid phases for many commercial and industrial processes.

SUMMARY OF THE INVENTION

The inventive method of dispersing or suspending a solid phase in a liquid phase uses a continuous mixer, and the solid and liquid phases are fed continuously into the mixer at respective input rates resulting in a combined proportion of solid phase to liquid phase. The combined proportion is continuously formed into a third phase as a plastic-consistency layer extending all around the mixing region. The third phase is thick enough in its plastic consistency for continuously receiving the solid and liquid phases as they are input into the mixing region and for preventing passage through the mixing region until the solid and liquid phases are homogeneously mixed together. The third phase is thoroughly mixed until it changes from its plastic consistency to a substantially more flowable fourth phase capable of continuous output flow from the mixer. The invention is applied to several specific materials to result in novel products differing from the prior art in the percentage of solids dispersed or suspended.

DRAWINGS

DETAILED DESCRIPTION

Figure 1:
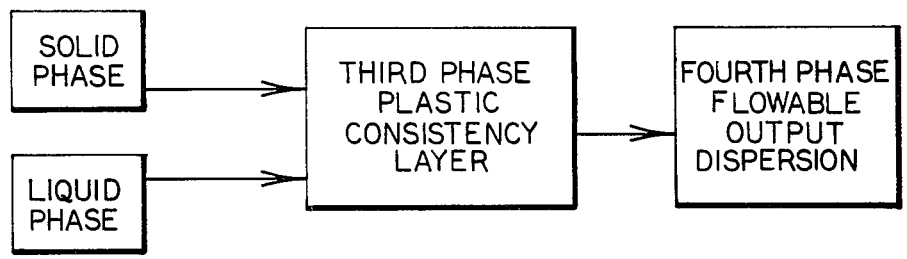
FIG. 1 is a schematic block diagram showing the inventive method.
Figure 2:
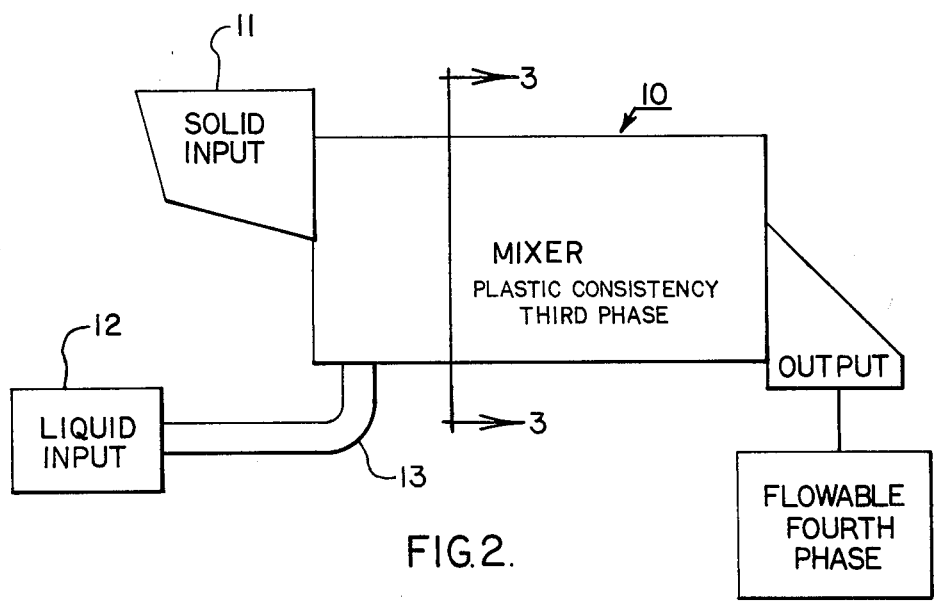
FIG. 2 is a schematic elevational view of a mixer arranged according to the invention.

The inventive method uses a continuous mixer having a mixing region between a generally coaxial stator and rotor. A suitable mixer is disclosed in U.S. Pat. No. 3,806,050, and all the information disclosed in that patent is incorporated herein by reference. Variations on the basic mixer can also be used to practice the inventive method, and other mixers may be devised for practicing the invention, once the process is clearly understood.

The best mixer known at present for practicing the inventive method uses a generally cylindrical and coaxial stator and rotor having confronting surfaces carrying discrete bars. The rotor forces the incoming material into a continuous layer around the stator, and the rotor bars both move through the material and grip the material sufficiently to move it around the stator. The stator bars resist the generally circumferential motion of the material and force the layer to increase in depth sufficiently to require the rotor bars to work through it and move it around the stator. The stator bars are also oriented to advance the material from the input toward the output as the material moves circumferentially. The rotor then works the material vigorously and the stator offers resistance and controls the movement of the material.

Such a mixer can be used for many mixing, refining, and reacting processes, and the invention involves the discovery that proper use of such a mixer produces unique results in dispersing or suspending a solid phase in a liquid phase. The dispersion or suspension process is continuous and quite different from prior art methods. It also produces far more complete dispersions containing a substantially higher proportion of solid phase and having a generally lower viscosity than dispersions made by prior art methods when diluted to the same solid-phase proportion. The inventive method not only produces better results, but does so in a faster and less expensive way, because the process is continuous. Also, the better dispersions or suspensions made by the inventive method often economize on chemical additives that would otherwise be required to achieve the best possible dispersions or suspensions by prior art methods.

An important part of the invention involves continuously combining the solid and liquid phases into a third phase having a plastic consistency and formed as a layer extending all around the mixing region in the mixer. The plastic consistency of the third phase varies somewhat with different materials, but is generally of the consistency of glazing compounds, caulking compounds, putty, pastry dough, etc. It is not pourable and does not flow, and it is resilient to the touch. If the plastic-consistency third phase is left in the mixer and the mixer opened up, the third phase stays in place and can be handled and inspected. One function of the third phase is to act as a holder or retainer receiving and engulfing the solid and liquid phases as they are input, and preventing any passage through the mixing region until the solid and liquid phases are homogeneously mixed together. The third phase also forms a layer deep enough so that the rotor bars are required to work through the layer and also grip it sufficiently for moving it around the stator.

If a layer having less than a plastic consistency is formed, then it is insufficiently viscous for the rotor to work on it, and it will flow through the mixer without accomplishing much work and without producing a thorough dispersion or suspension. If the plastic-consistency layer is made too viscous, the dispersion or suspension is also incomplete, and excessive power is consumed with unsatisfactory results.

Inspection of the plastic-consistency layer reveals a coarseness indicating incomplete mixing near the input region of the mixer and increasing evenness and homogeneity as the layer extends toward the output region of the mixer. After the solid and liquid phases are completely and homogeneously mixed together, the third-phase layer is changed to a much more flowable fourth phase occurring in the mixing region and flowing out the output. The flowable fourth phase is a substantially complete dispersion or suspension of the solid phase in the liquid phase.

The plastic-consistency third phase cannot be formed in a conventional mixer using a high-rpm impeller and high fluid shear, because the third phase is too viscous for continuous fluid shear and would either stall a high-rpm impeller or produce so much heat as to burn the material. Instead of continuous fluid shear in the mixer practicing the inventive method, shear occurs in discrete, but rapid, increments as small portions of the material are torn apart, cast about, and tumbled together as the rotor bars slide through the material and force it through the stator bars.

The feed rate through the mixer is directly proportional to the input rate, and if input is interrupted, the rotor quickly works the contents of the mixer into a layer in the stator just out of reach of the rotor bars. As more material is input to the mixer, the rotor works it into the existing plastic-consistency layer which increases in depth as a function of the input rate requiring the rotor bars to engage more of the material and work through the material with a sufficient grip to move the layer circumferentially around the stator. The stator helps control this process by resisting the circumferential flow and by advancing the material axially toward the output in proportion to the circumferential movement.

The proportion of solid phase dispersable or suspendable in a liquid phase by the inventive method is generally higher than the proportion of the same solid phase dispersable or suspendable in the same liquid phase by prior art methods. Also, when a dispersion made according to the invention is adjusted to the same proportion of solid phase to liquid phase as attainable by prior art methods, the dispersion made according to the inventive method generally has a lower viscosity than the equivalent prior dispersion or suspension. The reason for this is not certain, but evidence indicates that the uniformity and completeness of the dispersion and suspension made by the inventive method and changes in the surface chemistry of the materials reduces the viscosity substantially below the viscosity expectable from prior art methods.

To practice the inventive method, a mixer is selected for its continuous capacity to produce, circulate, and work on a plastic-consistency third phase as described above. The mixer is operated, and the solid phase and liquid phase are fed continuously into the mixer at respective input rates predetermined by an estimate to produce a combined proportion of the solid phase to the liquid phase. Since the inventive method disperses or suspends a larger proportion of solid phase to liquid phase than is generally possible in prior art batch methods, the estimate for the combined proportion of the solid phase to the liquid phase is preferably a little higher than prior art suggestions. As the solid phase and liquid phase pass through the mixer, the power input to the mixer is monitored and the dispersion characteristics of the fourth phase are observed. Depending on the results, the respective input rates for the solid and liquid phases are varied until combination of the solid and liquid phases results in continuous formation of the plastic-consistency third phase and the flowable fourth phase within the mixing region. Adjustments can also be made chemically by adding thickeners, dispersants, lubricants, etc.

Adjustments in the chemical additives or the proportion of solid phase to liquid phase are based upon the results and the power consumption to increase the viscosity of the third phase if inadequate power is consumed and the third phase is not formed or is not thick enough in consistency to require the rotor to work on the material. Conversely, the viscosity of the third phase is reduced if excessive power is consumed and the material clogs in the mixer with no output at all or is output in a poorly mixed and poorly dispersed form. The proper proportion of solid and liquid phases to form the plastic-consistency third phase is quite sensitive for some materials and ordinarily does not vary over a wide range for most materials.

When the proper proportion is achieved, it is evidenced by the power input to the mixer being proportional to the rate of input of material to the mixer. Also, the fourth phase output from the mixer is flowable, and testing of the output reveals a substantially complete dispersion or suspension containing no agglomerates. For example, the output fourth phase for some of the inventive dispersions has been tested by passage through a a 325-mesh sieve, where consistently less than 1% by weight of the solid phase is retained, and the retention is often less than 0.2% by weight of the solid phase.

The mixer can also be opened up for direct observation of the plastic-consistency third phase layer to reveal the continuous engulfing of the first and second phases into the third-phase layer whose plastic consistency is thick enough to hold the materials in the mixing region until the solid and liquid phases are homogeneously mixed together. Toward the axial output end of the plastic-consistency third phase, the viscosity substantially lowers to form the flowable fourth phase that is output as a substantially uniform dispersion or suspension.

After the proper proportion of solid phase to liquid phase is established relative to any chemical additives, the mixer is operated continuously with continuous input of the solid and liquid phases for continuously producing the third phase and the fourth phase. Thereafter, the fourth phase can be easily diluted with more of the liquid phase in a conventional mixer to achieve whatever proportion of solid phase to liquid phase is desired. Additional solid phase cannot be added to the output, even in a second passage through the mixer, because the plastic-consistency third phase cannot be recreated by addition of more solid phase. If this is attempted, the layer within the mixer has too high a proportion of solid material to form a plastic-consistency layer, and the output is not dispersed. If only a small amount of additional solid phase is added to the output and run back through the mixer, the resulting material is so flowable that a plastic-consistency layer is not formed and the machine does no useful work. So the output phase from practice of the inventive method contains approximately the maximum proportion of solid phase that can be fully dispersed or suspended in the liquid phase.

The drawings schematically show the practice of the invention, and variations in the inventive method differ primarily in the materials and proportions used, any chemical additives used, and the way the materials are introduced into mixer 10. The solid and liquid phases can be input to mixer 10 together or separately, depending upon the materials involved. The solid phase is ordinarily finely divided particulate material, and if it can be mixed with the liquid phase beforehand to produce a flowable or feedable mix, then this can be fed directly to mixer 10 through input 11. If precombination of the solid and liquid phases produces a sticky material or a material difficult to feed, then the solid phase can be fed to input 11 separately while the proper proportion of liquid phase is fed from a supply 12 through a line 13 into a region of mixer 10 spaced axially a little way from the axial end input 11. The solid phase can contain a portion of the liquid phase by not being thoroughly dry, and even all of the liquid phase can be combined with the solid phase. One way to do this is with a material in filter cake form, which is a premixture of a solid phase and a liquid phase, the mixture being filtered, partially dried, and then broken into samll chunks containing the desired amount of liquid phase. There can also be multiple inputs for either or both solid and liquid phases with the different inputs receiving either a single phase or a combination of both phases.

Figure 3:
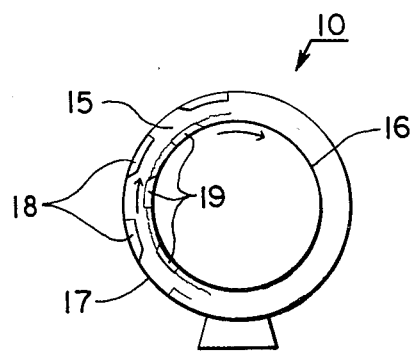
FIG. 3 is a schematic cross-sectional view of the mixer of FIG. 2 showing a plastic-consistency third phase.

The cross-sectional view of FIG. 3 schematically illustrates the formation of the plastic-consistency third phase 15 as a layer between the rotor 16 and the stator 17. Bars 18 in the stator resist the circumferential movement of layer 15 and control its advance toward the output of machine 10, and bars 19 on rotor 16 work through the layer 15 and move it circumferentially through the stator bars 18. The relatively long arrow represents the relatively high rpm of the rotor, and the relatively shorter arrow represents the relatively slower movement of the layer through the stator in response to the working effect of the rotor bars 19.

Many dispersions made by the inventive method have consistently contained a larger proportion of solid phase in the liquid phase, have achieved substantially complete dispersions with no agglomerates, and have resulted in viscosities lower than the viscosity of a dispersion of the same materials made by prior art methods, after adjustment to the same solid proportions. The dispersions are made very quickly because of the continuous operation of the mixer, so that continuous dispersions or suspensions can be made at rates of several tons per hour for many materials.

The following examples of dispersions according to the invention are all dispersions made in water with percentages by weight of material, and they illustrate the differences in results achieved by the invention. In each example, the middle percentage produced a complete dispersion of small particles less than 1% of which were retained in a pass through a 325-mesh sieve. Small amounts of dispersants, thickeners, lubricants, and other chemicals can be added to the examples shown below, and the weight percentages given in the examples can vary somewhat from the recited amounts and still successfully form the plastic-consistency third phase and produce a well-dispersed and pumpable fourth phase.

EXAMPLE I

Cabosil (submicroscopic fire-dry fumed silica)
- 25% - Too fluid - fluid dispersions containing some small agglomerates.
- 30% - Plastic-consistency layer formed - soft gel containing no agglomerates.
- 35% - Too dry - sticky pellets with very little dispersion.
- 22% - Maximum for prior art methods

EXAMPLE II

Kaolin Clay
- 60% - Too fluid - fluid dispersion containing some small agglomerates.
- 72% - Plastic-consistency layer formed - fluid dispersion contaning no agglomerates.
- 80% - Too dry - very stiff gel containing undispersed material
- 68% - Maximum for prior art methods.

EXAMPLE III

Lamp Black
- 15% - Too fluid - fluid dispersion containing some small agglomerates.
- 20% - Plastic consistency-layer formed - soft gel containing no agglomerates.
- 35% - Too dry - very stiff gel cntaining undispersed material.
- 14% - Maximum for prior art methods.

EXAMPLE IV

Titanium Dioxide
- 55% - Too fluid - fluid dispersion containing some small agglomerates.
- 75% - Plastic-consistency layer formed - fluid dispersion containing no agglomerates.
- 82% - Too dry - mixture of hard gel and solid material very little dispersion.
- 68% - Maximum for prior art methods In addition, the following materials were dispersed in water at the indicated percentage of solid materials by weight to result in a plastic-consistency third-phase layer, and producing a complete dispersion and a retention of less than 1% of solid materials in a 325-mesh sieve. Examinations of the dispersions revealed no agglomeration.

| Material | % of Solid Phase by Weight Using Inventive Method | Maximum % of Solid Phase by Weight Using Prior Art Methods |
| --- | --- | --- |
| bentonite clay | 30 | 5 |
| calcium carbonate | 76 | 72 |
| lead chromate | 75 | — |
| calcined clay | 65 | 55 |
| delaminated clay | 76 | 68 |

The bentonite clay dispersion also resulted in 100% hydration, and since bentonite clay is useful as a lubricating mud for drilling oil wells, a 100% hydration and complete dispersion in water according to the invention has substantial advantages over prior art results. Also, for calcium carbonate and several other materials the viscosity of the dispersed output is substantially lower than the viscosity of dispersions of the same material by prior art methods, after dilution to the lower maximum solids percentage used in prior art methods.

Those skilled in the art will appreciate that the dispersions according to the invention can be made with a higher proportion of solid materials than was possible in prior art methods, and since the dispersion is complete with no agglomerates, the output phase can be later diluted to any desired proportion of solids by mixing in more liquid phase with conventional equipment. The completeness of the dispersions or suspensions, their lower viscosity, and the speed and efficiency by which they can be made continuously presents substantial advantages as will be apparent to those skilled in the art. The inventive method can also be applied to dispersions and suspensions of many other materials once the basic principles of the invention are clearly understood.

I claim:

1. A method of dispersing or suspending a solid phase in a liquid phase by using a mixer having a mixing region arranged so said phases enter an input region of said mixing region, move through said mixing region, and exit from an output region of said mixing region, said solid and liquid phases being continuously fed into said input region of said mixing region, and said method comprising:

a. establishing the relative input rates for said solid and liquid phases so that the combination of said phases in said input region continuously forms a substantially non-flowable third phase extending from said input region toward said output region and having a plastic consistency thick enough to receive and hold subsequently input material and prevent any direct passage of material through said mixing region until said solid and liquid phases are homogeneously mixed together, and said plastic-consistency third phase also being thick enough to produce high mixing shear in response to working by said mixer;

b. shearing said plastic-consistency third phase with an element moving in said mixing region to apply discrete and rapidly occurring high shear increments to said plastic-consistency third phase;

c. using said high shear to work said plastic consistency third phase about within said mixing region so that all of said third phase encounters said moving element and said high shear increments are quickly applied uniformly throughout said third phase;

d. using said high shear and said working of said third phase to mix said solid and liquid phases more homogeneously together with increasing distance from said input region toward said output region;

e. continuing said high shear and said working of said third phase sufficiently to transform said non-flowable third phase continuously into a relatively flowable fourth phase before said third phase reaches said output region, said fourth phase being a uniform dispersion or suspension of said solid phase in said liquid phase; and f. separating said fourth phase continuously from said third phase and continuously moving said fourth phase away from said third phase and through said output region without mixing said fourth phase back into said third phase.

2. The method of claim 1 including forming said plastic consistency third phase into a layer extending around a cylindrical stator and applying said high shear to said layer with a cylindrical rotor.

3. The method of claim 1 wherein said liquid phase is water, said solid phase is bentonite clay, and said bentonite clay in said fourth phase is substantially 100% hydrated.

4. The method of claim 1 wherein said solid phase is selected from the group consisting of bentonite clay; calcium carbonate; lead chromate; calcined clay; delaminated clay; fumed silica; kaolin clay; carbon black; and titanium dioxide.

* * * * *